United States Patent [19]

Cramer et al.

[11] Patent Number: 4,566,506
[45] Date of Patent: Jan. 28, 1986

[54] SYSTEM FOR DISPENSING FLOWABLE FOOD MATERIALS

[75] Inventors: Clarence W. Cramer, Burlington; Alfred R. Brewin, III, Moorestown, both of N.J.

[73] Assignee: Campbell Soup Company, Camden, N.J.

[21] Appl. No.: 664,223

[22] Filed: Oct. 24, 1984

[51] Int. Cl.⁴ .................... B65B 3/04; B05C 11/00
[52] U.S. Cl. ........................... 141/160; 118/25; 118/669; 118/684; 222/160; 141/177
[58] Field of Search ............... 118/25, 24, 669, 676, 118/684; 141/129, 183–191, 130–182; 222/161, 196, 202, 199, 55, 141, 160

[56] References Cited

U.S. PATENT DOCUMENTS 3,528,386  9/1970  Morine ........................... 118/25

Primary Examiner—Houston S. Bell, Jr.
Attorney, Agent, or Firm—Albert L. Free

[57] ABSTRACT

A system which dispenses sauce or the like onto selected areas of plates moving in a train beneath a dispenser. The areas upon which the sauce is to be dispensed may for example be those containing meat portions of non-uniform width in directions normal to the direction of motion of the plate or the conveyor. A slot-shaped dispensing aperture on the lower side of the dispenser is automatically opened and closed progressively by a movable closure in such manner that the length of the open portion of the slot matches the corresponding dimension of the areas to be dispensed upon as they move beneath the dispenser. This enables complete coverage of these areas with the sauce, without dispensing it upon other portions of other areas where it is not desired.

7 Claims, 12 Drawing Figures

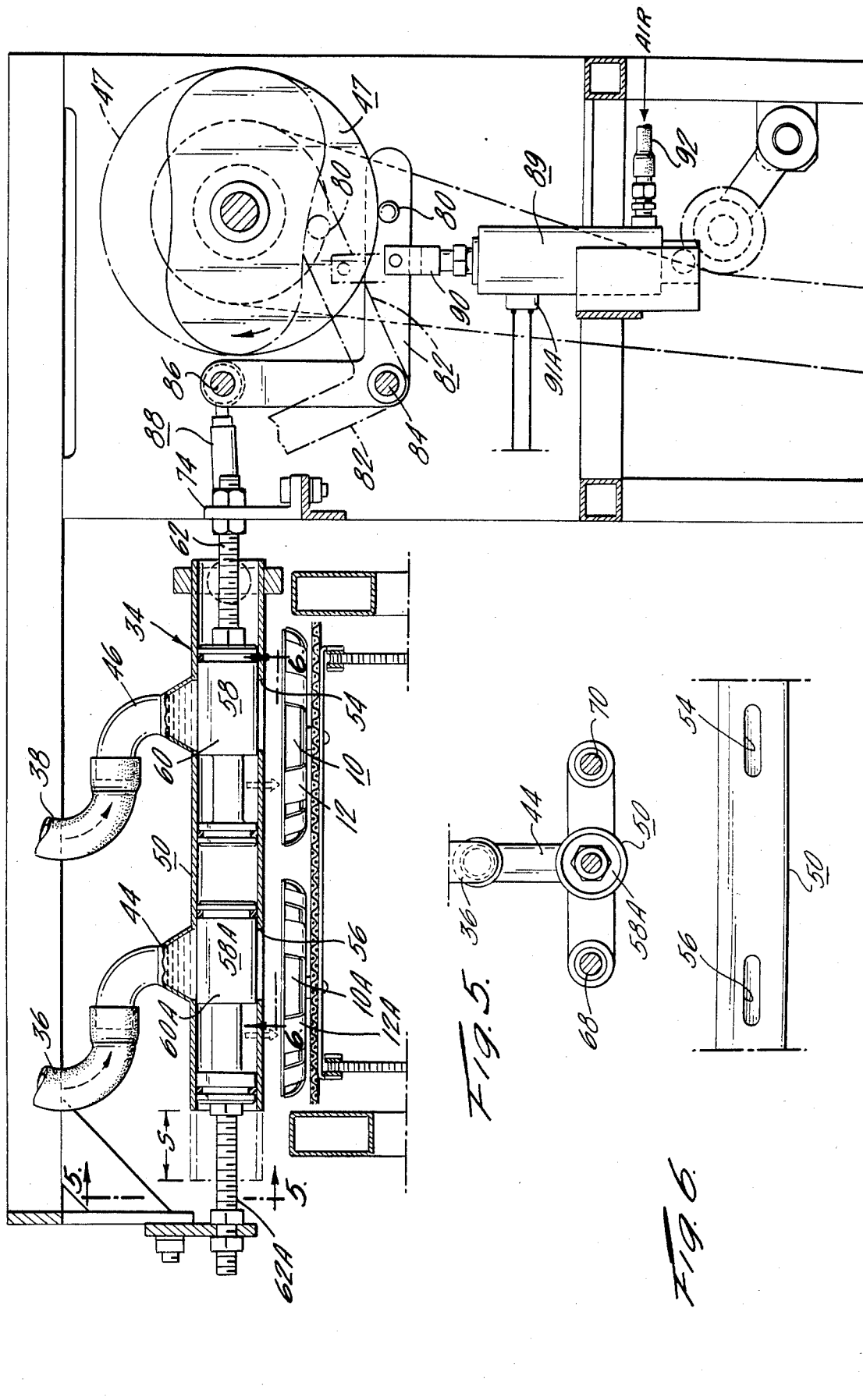

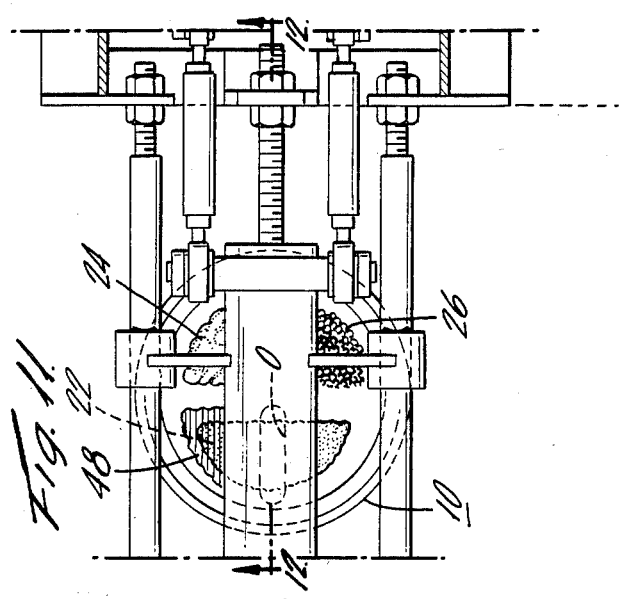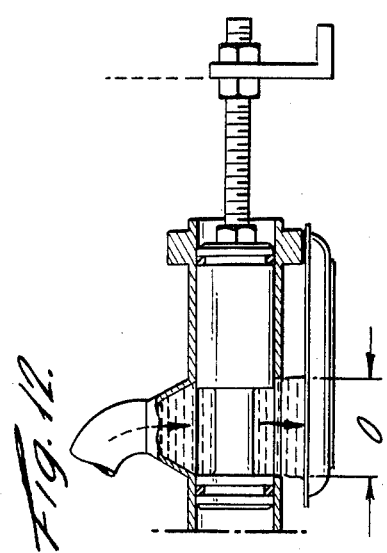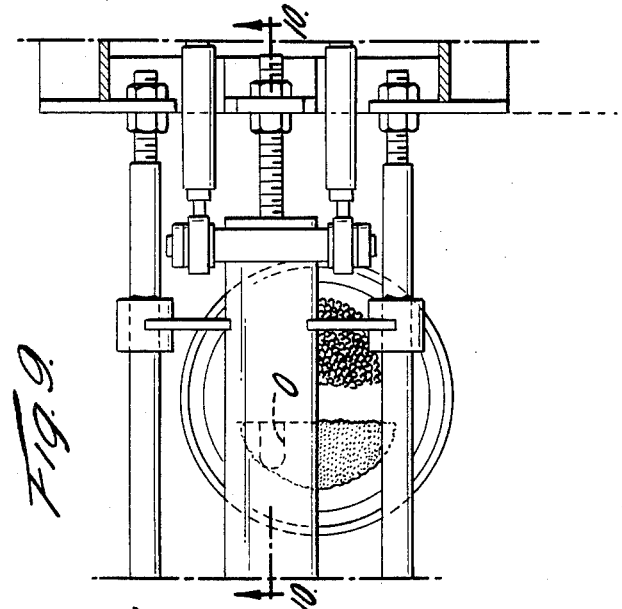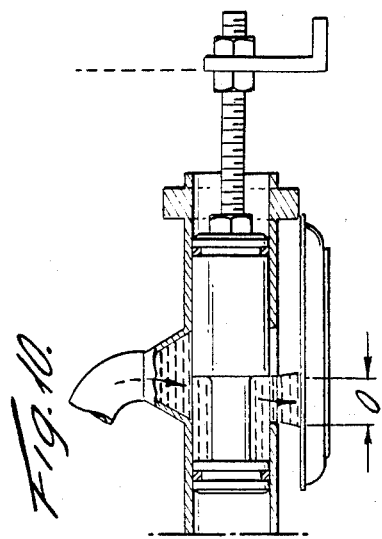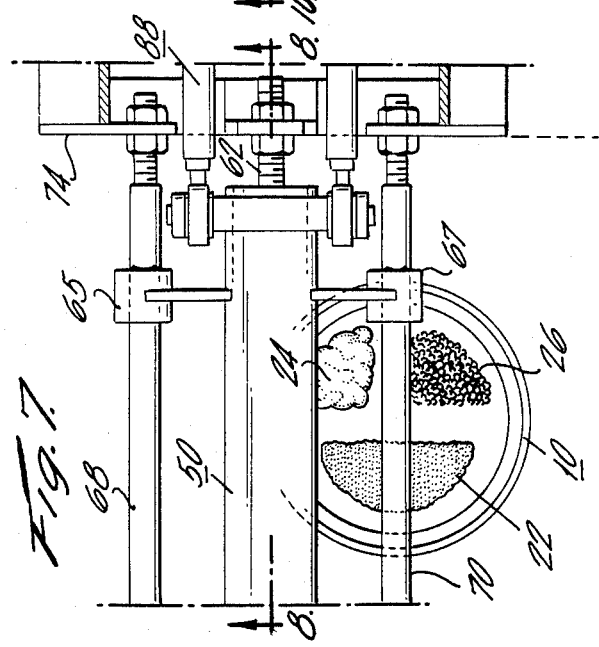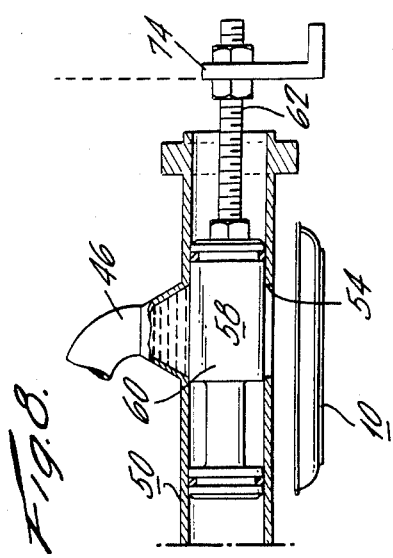

SYSTEM FOR DISPENSING FLOWABLE FOOD MATERIALS

BACKGROUND OF THE INVENTION

This invention relates to systems for dispensing flowable food material upon a container moving on a conveyor beneath a dispenser of the flowable food material. It relates particularly to such systems in which it is important to limit the dispensing of the material to predetermined parts of the container.

An example of the latter type of system, with respect to which the present invention will be described with particularity, is one which dispenses flowable food materials such as sauces or gravies upon particular portions of food on plates passing beneath the dispenser. For example, the containers may be plates having food portions on them which are destined to be frozen to provide frozen dinners; in one example the plate may contain a meat portion on one half of the receiving surface of the plate, on which sauce is to be dispensed. In such case it is possible, by conventional means, to provide a dispenser above the plate which will be turned on once during each passage of a plate below it to dispense sauce upon a major part of the meat portion. However, unless the plate is stopped beneath the dispenser, the conventional dispenser cannot cover the meat portion uniformly and completely with the sauce without depositing sauce beyond the meat portion, for example on the rim of the plate, beyond the plate, or on other food portions on the plates, as examples. Also, for reasons which will be clear to one skilled in the art, it is undesirable in many cases to have to move the plates in an intermittent, stop-go manner, and instead it is greatly preferred to permit the train of plates to move continuously under the dispenser while still achieving precise dispensing only upon the desired areas of the plates.

It is therefore an object of the present invention to provide precise dispensing of a flowable food material upon a predetermined moving area having non-uniform dimensions in directions normal to the direction of motion of said area.

It is also an object to provide the desired accurate coverage of the predetermined area upon which the flowable material is to be dispensed by means which are easy to make, use and maintain, which are reliable in operation, and which can readily be adapted to deposit the flowable material upon various different sizes and shapes of areas of the container.

SUMMARY OF THE INVENTION

These and other objects of the invention are achieved in accordance with the invention by a system which employs a dispenser located above the path of the food containers and having aperture means through which the flowable material is dispensed, together with a control system for operating a closure means for the aperture means in such way that the length of the open portion of the aperture means, in a direction normal to the direction of motion of the container, is at any time substantially equal to the corresponding dimension of the area upon which the material is to be deposited. The width of the aperture means along the direction of motion of the container is preferably small compared with its transverse length. In the operation of the invention, the aperture means is position directly above the path taken by the moving area upon which the flowable material is to be dispensed, and the length of the opening of the aperture means is varied to conform directly and exactly with the transverse dimension of the area directly beneath it upon which deposit is to be accomplished.

For example, in a simple case in which a meat portion occupies substantially fully the half of a plate which is on one side of the center line of the plate and is to be completely covered with a sauce, the aperture means will be closed until the leading edge of the meat portion first reaches a position under the aperture means, at which time the aperture means will proceed to open progressively as the plate moves further along beneath it, reaching a maximum open position when the plate is half-way through its passage beneath the dispenser; at that point, reclosing of the opening begins and proceeds at the same rate and in the same manner as the opening motion, so that by the time the trailing side of the meat portion has reached the dispenser, the dispensing opening is again completely closed, in which condition it remains until the meat portion on the next container first appears beneath it. In this way the selected area on the container can be covered with the flowable material, despite the fact that the lateral dimension of the selected area of the plate is non-uniform and despite the fact that the container moves continuously beneath the dispenser.

In a preferred form of the invention described in detail hereinafter, the opening and closing of the aperture means is controlled by relative motion of a piston within the body of the dispenser; to effect this relative motion, it is preferred that the piston be held fixed and the body of the dispenser moved to produce controlled progressive opening and closing of the aperture means. Such an arrangement not only provides the operation described above, but does so in a manner which is simple, reliable and easily adaptable to the particular requirements of the application.

In the preferred embodiment, the desired opening and closing of the aperture means is produced in response to rotation of cam means controlled from the same source that operates the conveyor carrying the containers, so that the desired synchronization between operation of the dispenser and position of each container is maintained. While not presently preferred, it is possible instead to provide apparatus which will sense when the edge of each container in a train reaches the edge of the dispenser and, in response thereto, produce an appropriately-timed opening and closing cycle of the closure means to effect proper dispensing, even though the containers are not evenly spaced from each other along the conveyor.

Preferably, means are also provided for assuring that the dispenser will be cut off should the conveyor be shut off; this may be accomplished by sensing the arrest of the conveyor motion and overriding the cam action at such time to assure cut-off of the dispenser.

BRIEF DESCRIPTION OF FIGURES

Other objects and features of the invention will be more readily understood from a consideration of the following detailed description, taken in connection with the accompanying drawings, in which:

FIG. 4 is a fragmentary sectional elevational view taken along the lines 4—4 of FIG. 3;

FIG. 5 is a fragmentary transverse sectional elevational view taken along lines 5—5 of FIG. 4;

FIG. 6 is a fragmentary bottom plan view taken along the lines 6—6 of FIG. 4, showing the aperture means on the bottom of the dispenser body;

FIGS. 7, 9 and 11 are fragmentary plan views showing the operation of the invention for successive positions of the container with respect to the dispenser; and FIGS. 8, 10 and 12 are fragmentary sectional elevation views taken along the lines 8—8 of FIG. 7, lines 10—10 of FIG. 9 and lines 12—12 of FIG. 11, respectively.

DESCRIPTION OF PREFERRED EMBODIMENTS

Figure 1:
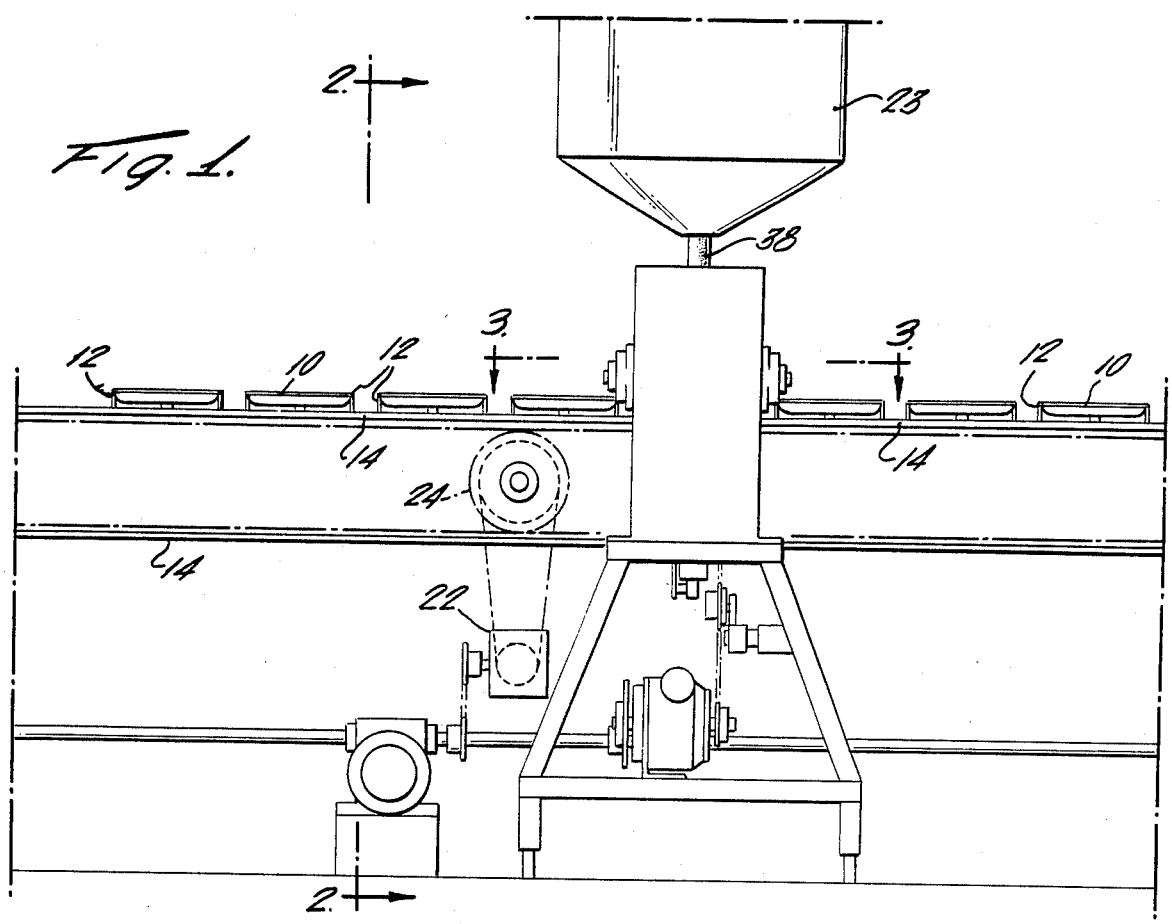
FIG. 1 is a schematic side elevational view of a system embodying the invention.
Figure 2:
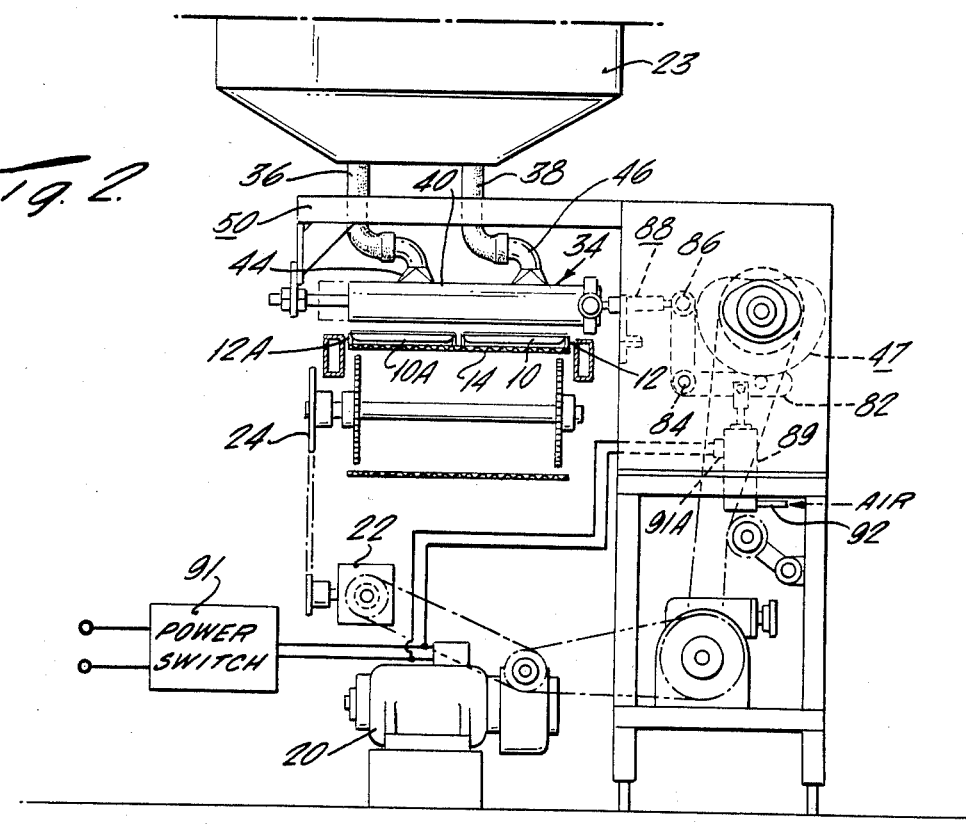
FIG. 2 is a transverse sectional elevational view taken along lines 2—2 of FIG. 1.

Referring now to the specific embodiment of the invention illustrated in the drawings by way of example only, FIGS. 1 and 2 show schematically a system constructed and operating in accordance with the invention. Here two parallel trains of flanged, dish-shaped containers or plates such as 10,10A are disposed on corresponding pallets such as 12,12A (FIG. 4) secured to, and moving along with, an endless chain conveyor 14; in this case the pallets and containers are fixed in known locations with respect to the conveyor. The two side-by-side identical trains of containers 10 and 10A can easily be accommodated because of the relatively small diameter of the containers compared with the width of the conveyor. The conveyor may be driven by a motor 20, through a power transfer box 22 and a sprocket 24, as shown.

Each container or plate in this example contains a meat portion such as 22,22A and other food portions such as 24,24A and 26,26A; the meat portion substantially covers an area at the bottom of the container which is entirely on one side of that diameter of the plate which extends along the direction of motion of the plates. That is, as viewed in FIG. 3, the meat portion occupies substantially the entire area of the left-hand side of the bottom of the container, but does not extend beyond this area. It is assumed in this example that it is the purpose of the system to dispense a sauce equally and uniformly over substantially the entire top surface of the meat portions and not onto areas beyond the meat portions, although once dispensed it may to some extent flow downwardly beyond the edges of the meat portion.

In this example the sauce may be stored in a reservoir 23, whence it is supplied through a dispenser 34 to the top surfaces of the meat portions. A pair of flexible feed lines 36 and 38 supply sauce from the reservoir to the body 40 of dispenser 34 by way of the corresponding two dispenser inlets 44 and 46, respectively. A cam arrangement 47 driven from motor 20 controls the dispensing action of the dispenser, as will be described in detail with respect to the other figures.

Figure 3:
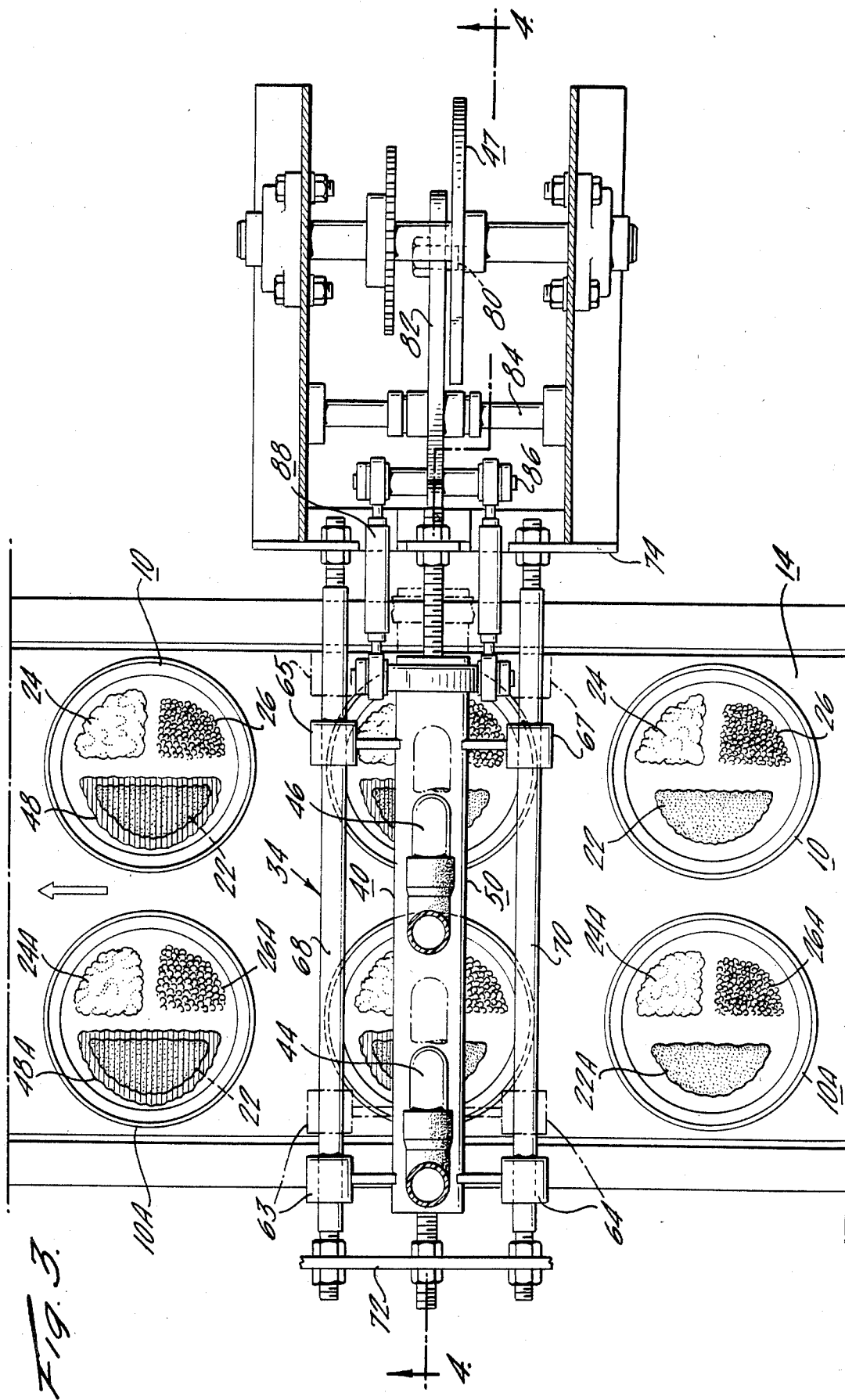
FIG. 3 is an enlarged fragmentary sectional plan view taken along lines 3—3 of FIG. 1, showing the invention in more detail.

FIG. 3 illustrates the dispensing portion of the system in more detail. The meat portions 22 and 22A are shown in the lower part of FIG. 3, at the upstream side of the dispenser 34, with the meat portions 22 and 22A not covered by any sauce. The sauce is dispensed as the two lanes of plates pass beneath the dispenser 34, to form the sauce layers 48 and 48A overlying the meat portions, covering them completely but not extending substantially beyond the meat portions, except to the slight extent to which the sauce flows slightly over the edges of the meat portions upon the bottom of the container.

There will now be described in detail a preferred form for the dispenser which makes possible this precision dispensing operation, and then the system elements which control the dispenser to effect the necessary coordination between container position and dispenser operation will be described.

As is shown in FIGS. 3, 4 and 7-12, the dispenser 34 comprises a body portion 50 in the form of an elongated hollow tube set across the path of the two lines of containers. The above-described inlets 44 and 46 are at the top of the body, and the dispensing aperture means 54 and 56 are provided in the bottom of body 50, in the form of transversely extending slots with rounded ends as shown particularly clearly in FIG. 6.

A first fixed piston 58, slideable with respect to the interior of the dispenser body along a direction normal to the direction of motion of the containers, is provided with a piston head 60 serving as the dispensing control member. An identical piston 58A is similarly provided with a piston head 60A. The external ends of pistons 58 and 58A are fixedly secured to a frame by mounting means 62 and 62A.

It is noted that in the position of the dispenser body shown in FIG. 4, the piston heads 60 and 60A completely block discharge of the sauce from the interior of the body of the dispenser through the aperture means 54 and 56. The piston heads therefore serve as closure means, capable of completely cutting off the dispensing of the sauce through the aperture means onto the underlying containers. However, the dispenser body 50 is mounted for controlled lateral motion whereby the apertures 54 and 56 are controlledly moved to the left, as viewed in FIG. 4, so as to be progressively further free of blockage by the piston heads 60 and 60A, thereby to control the area of the container upon which the sauce is dispensed. To this end, the body 50 is provided with pairs of outboardly positioned bearings 63,64 and 65,67 through which transversely extending mounting rods 68 and 70 extend slidingly. A tie bar arrangement 72 at the free end of the dispenser body joins the guide rods and the body to provide a rigid structure. At their opposite ends the mounting rods are secured to a mounting flange 74.

The dispenser body 50 is therefore slideable transversely to the conveyor line and with respect to the fixed pistons 58 and 58A. The position of the body 50 is determined at any time by the angular position of the cam 47 (see especially FIG. 4), which as mentioned above is direct driven through appropriate gear reducers and sprockets from the same common motor 20 which drives the conveyor. The angular position of the cam 47 therefore varies as a known function of the exact position of the containers moving along the conveyor.

To accomplish this, a cam follower 80 rides on the cam 47 and, for the full-line position of the cam shown in FIG. 4, holds the right-angle bell-crank 82 in the position shown in full line; crank 82 is rotatable about fixed pivot axis 84, to the broken-line position shown, when the cam rotates to its broken-line position. The full line positions are those for which the crank 82, acting through a pivot 86 secured to the dispenser body 50 by way of a pivot assembly 88, moves the body 50 to its extreme right-hand position where the piston heads 58 and 58A completely cut off the dispensing action.

The broken-line positions shown are those for which the body of the dispenser has moved to its extreme left-hand position to produce maximum discharge through the apertures 54 and 56.

In the example shown, the cam has a circular outline for about 180° of its circumference, providing complete cut off of the dispensing action from the time when the trailing end of one meat portion advances completely past the dispenser to the time when the leading edge of the next meat portion begins to appear under the dispenser; while the meat portion is passing under the dispenser, the cam follower moves radially inwardly along the cam to a maximum inward position corresponding to the condition in which the meat portion is aligned directly under the dispensing apertures; thereafter, upon continued rotation of the cam 47 the cam follower returns, by a similar path, to its original cut off position. The shape of the cam is selected so that the variable opening through the aperture means traces out the area upon which sauce is to be dispensed as the meat portion passes beneath the dispenser.

In this example an additional solenoid controlled pneumatic cylinder 89 is provided, with its actuator 90 secured to the crank 82 and, during normal operation pneumatically urges the cam follower toward the cam and hence does not interfere with the described operation; however, should the power switch 91 (FIG. 2) for the motor be shut off, such action shuts off current to the solenoid terminal connector 91A, permitting the cylinder 89 to retract its actuator 90 in response to pressurized air supplied through air inlet 92. This will return the crank to the full-line positions shown, or hold it there if it is already in this position, whereby the dispensing action is completely shut off, as is obviously desirable should the conveyor be shut off due to turning off of the power switch; clearly, one would not wish to continue dispensing sauce indefinitely with the conveyor stopped.

FIGS. 7-12 show the sequence of operation of the invention particularly clearly, especially with regard to the variations in the size and location of the openings through which dispensing occurs. These openings, which extend between the edges of the apertures and the adjacent sides of the piston heads, has been designated as O in these figures, which show clearly the scanning of the areas upon which deposition is intended to occur by the superjacent dispensing openings. While the figures only show the operation from initial shut-off to maximum dispensing opening, it is understood that this increase in length of the openings is followed by a corresponding decrease in their length as the area to be dispensed upon passes farther out from beneath the dispenser apertures.

Accordingly, there has been described a system for dispensing flowable food material, here exemplified as a sauce or gravy, upon a subjacent area of a moving container, exemplified as a meat portion on a frozen food plate or tray, in such manner as to provide dispensing upon the area despite its non-uniform transverse dimensions, this accomplished by automatic variation of the size and position of the dispensing opening as a function of the position of the area along the conveyor.

While the example shown uses a single dispenser aperture for each container line, serving one half of each plate and opening from the center of the plate outwardly toward the plate periphery to controlled and varying extents, it is for example possible to use a plurality of apertures in the dispenser for each line, to vary the aperture openings on either or both sides of the center line of the containers, to use a plurality of dispensers, and to open and close any dispensing aperture more than once per transversal of a container beneath it.

Also, while a simple gravity feed of the flowable material into and out of the dispenser is shown, it will in many applications be desirable to meter a known quantity of material through the dispenser during each cycle of dispensing, by a positive-displacement pump piston, for example.

Accordingly, while the invention has been described with particular reference to specific embodiments thereof in the interest of complete definiteness, it will be understood that it can be embodied in a variety of forms diverse from those specifically shown and described, without departing from the spirit and scope of the invention as defined by the appended claims.

What is claimed is:

1. In a dispensing system for dispensing a flowable food material from a dispenser onto a predetermined area of a subjacent food container moving on a conveyor beneath said dispenser, said area having non-uniform length dimensions in a direction normal to the direction of motion of said container, the improvement wherein:

said dispenser comprises an adjustable dispensing aperture means and a passageway for receiving said food material and for passing it through said dispenser to said aperture means, said dispensing aperture means extending substantially directly over the path taken by said area of said container as it is moved by said conveyor, having a maximum length dimension normal to said direction of motion of said container which is at least as great as the corresponding maximum dimension of said area, and having a width dimension along said direction of motion which is small compared with the corresponding width dimension of said container area;

movable closure means for said aperture means, controllably movable with respect to said aperture means along a direction transverse to the direction of motion of said food container to vary the length of the portion of said aperture means which is open at any time; and control means responsive to changes in the position of said container with respect to said dispenser for controlling said transverse motion of said movable closure means to change said length of said open portion of said aperture means as a function of said position of said container, so that said material is dispensed through said aperture means over substantially the entirety of said area of said container, but not substantially outside of said area, as said container passes beneath said dispenser.

2. The system of claim 1, wherein said aperture means is in the form of a slot extending normal to said direction of motion of said container, and said closure means is moved with respect to said aperture means by holding said closure means fixed while moving said aperture means with respect to said closure means.

3. The system of claim 2, wherein said control means comprises cam means for controlling motion of said aperture means with respect to said closure means.

4. The system of claim 3, wherein said container is round, said area is substantially that of the half of said container on one side of that diameter of said container which extends along said direction of motion, and said closure means is controlled to close said aperture means at the leading and trailing edges of said container and to open said aperture means to its maximum open position when said container is centered beneath said dispenser.

5. The system of claim 4, wherein said dispenser comprises a hollow body portion, said aperture means is disposed on the lower side of said body portion, and said closure means comprises a piston, inside and movable with respect to said body portion, to vary the extent of opening of said aperture means.

6. In a system for dispensing flowable food material onto a predetermined top area of a container as it moves on a conveyor, said area having a non-uniform length dimension as measured in a direction normal to the direction of motion of said container:

dispenser means having aperture means on its lower side positioned directly over the path of said container, for dispensing said flowable food material downwardly onto said area as it passes beneath said aperture, said aperture means having a length at least as great as said length dimension of said area and a width dimension along said direction of motion which is small compared with said length of said aperture means;

closure means for said aperture means, relatively movable with respect to said aperture means along a direction transverse to the direction of motion of said container, for varying the length dimension of the opening in said aperture means through which said material is dispensed; and means for varying the transverse position of said closure means as said area of said container passes beneath said aperture, so as to maintain the length of said opening substantially equal to the corresponding length dimension of said area immediately below said opening.

7. The system of claim 6, wherein said dispenser comprises a hollow body and piston movable therein with respect to said body to vary the length of said opening, means holding said piston fixed, and cam means responsive to the position of said container on said conveyor for moving said body with respect to said piston.

* * * * *